May 22, 1945. R. G. BOATRIGHT, JR., ET AL  2,376,323
PROCESS OF TWO-STAGE CATALYTIC DEHYDROGENATION
OF PARAFFIN HYDROCARBONS TO DIOLEFIN
Filed Jan. 2, 1942   3 Sheets-Sheet 1

INVENTOR
ROBERT G. BOATRIGHT JR
WILLIAM C. HEWITT
BY
ATTORNEY

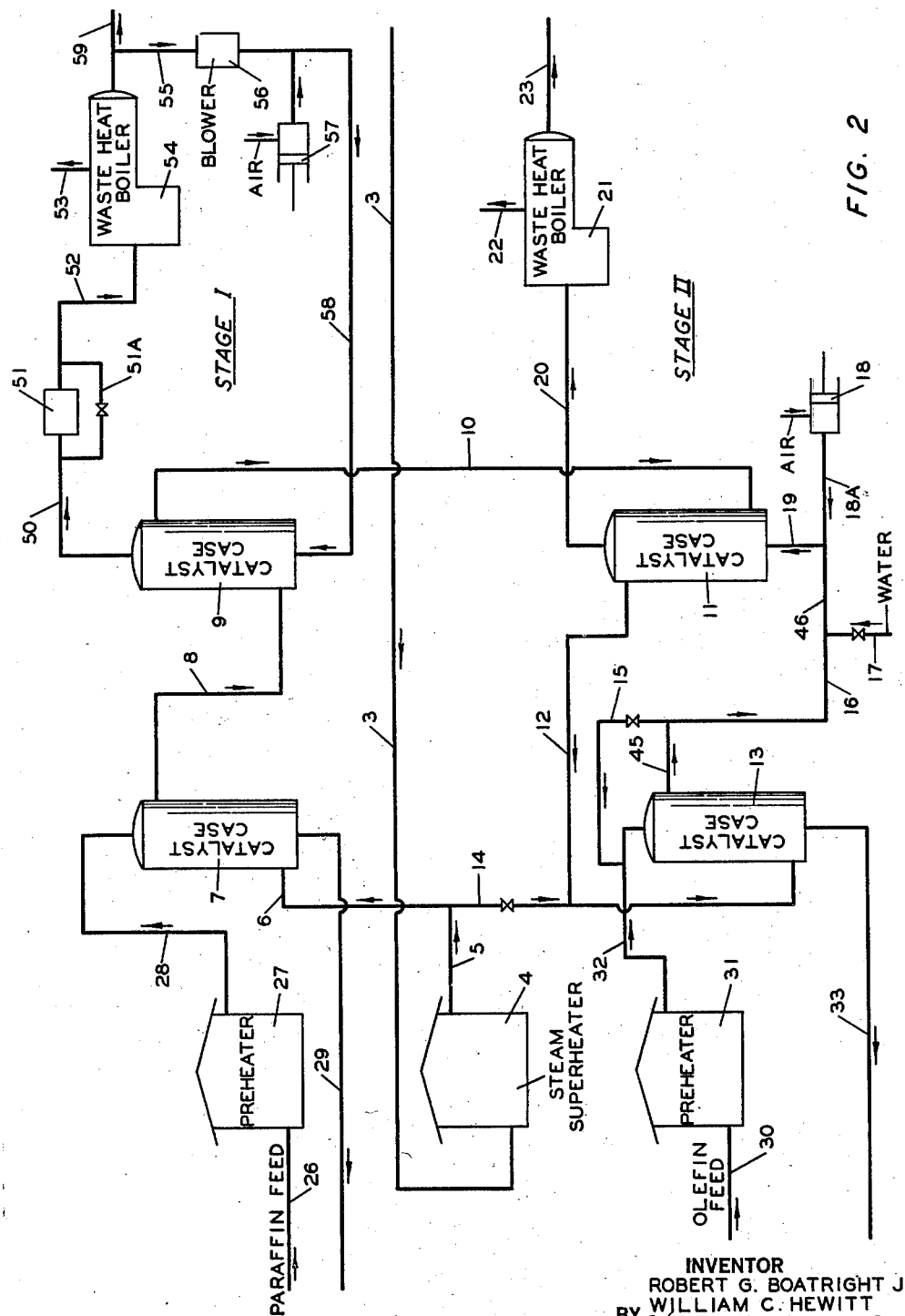

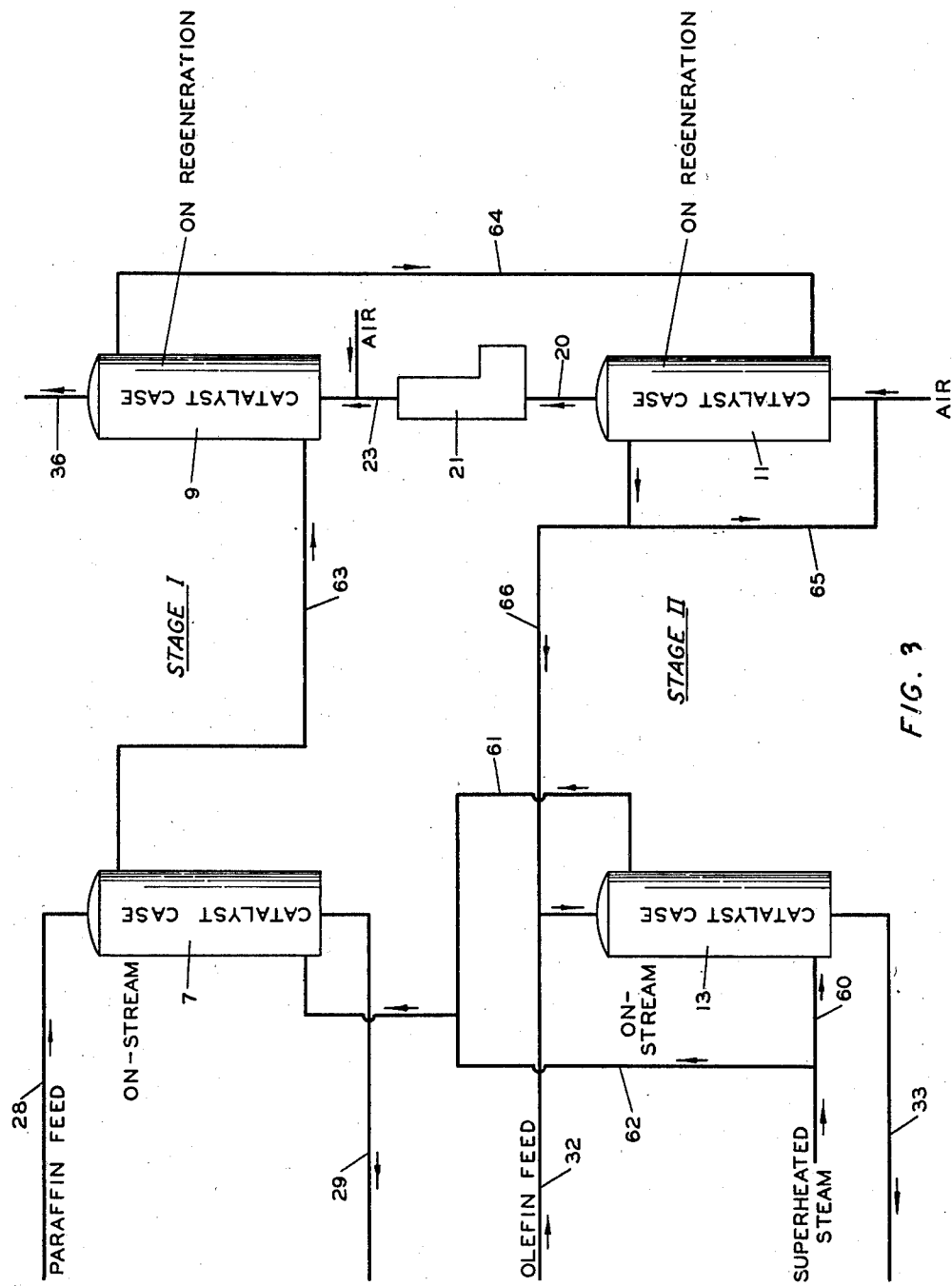

UNITED STATES PATENT OFFICE 2,376,323

PROCESS OF TWO-STAGE CATALYTIC DEHYDROGENATION OF PARAFFIN HYDROCARBONS TO DIOLEFIN

Robert G. Boatright, Jr., and William C. Hewitt, Bartlesville, Okla., assignors to Phillips Petroleum Company, a corporation of Delaware Application January 2, 1942, Serial No. 425,450

3 Claims. (Cl. 260—680)

This invention relates to a process for heating, cooling, and regenerating catalyst by the circulation of steam or the like, and more particularly to such a process as applied to catalytic hydrocarbon conversion such as the two-stage catalytic dehydrogenation of butane to butadiene. It is well known in the art that in the operation of many reactions which must be catalyzed, heat control must be obtained by the introduction of an external medium. This invention is intended to apply to catalytic process control and to catalyst regeneration extended both to endothermic and exothermic reactions, even to those borderline cases wherein heat input may, perhaps, vary from positive to negative values within very narrow limits. For illustration, a reaction which is endothermic must be supplied heat to maintain a constant reaction temperature throughout the catalyst bed. Catalyst cases are usually of a tubular construction, catalyst being located in the tubes. Heat is supplied to the catalyst through the medium of a higher temperature fluid circulated through the shell of the catalyst case.

The catalytic reaction proceeds for a period of time which is dependent upon the deposition of carbon on the surface of the catalyst and the consequent decrease in activity. When the catalyst activity has decreased to a predetermined extent, the carbon must be removed by some means such as burning. A regenerating or reactivating gas containing a small percentage of oxygen is passed over the catalyst at temperatures of the order of 600 to 1000° F. and the burning of the carbon deposited on the surface of the catalyst proceeds. This combustion reaction is exothermic and some means of removing the heat from the system must be supplied. This is usually done by the circulation of some medium through the shell of the catalyst cases while the reactivation process is in operation.

The efficiency of formation of desired conversion products from a number of catalyzed reactions increases with a decrease in the partial pressure of the reactants in the system. In order to decrease this partial pressure, a neutral diluent of some nature may be added to the hydrocarbon stream passing over the catalyst.

It is the object of this invention to use a single, steam cycle to supply heat to the catalyst while operating, cool the catalyst while regenerating, function as diluent for the reactants, and also function as regenerating medium. Other objects are to enable maximum utilization of energy and keep the cost of equipment for a given case at a minimum. Other objects of this invention will be apparent as the following description proceeds.

The usual gas now used in the art as a heating, cooling, or regenerating medium is a furnace flue gas. This gas may actually be supplied from some furnace operating in conjunction with the catalyst cycle or from some auxiliary furnace installed specifically for the purpose. In either case, the flue gases must be circulated by blowers, which are expensive to install and operate. Pressure drop is of primary importance in all processes utilizing blowers. Consequently, expensive large connecting lines and valves are required. At the elevated temperatures usually used in these operations, a nickel-steel alloy is required for the lines and valves, thereby materially increasing the cost of the installation over that in which carbon steel is used. Using the steam cycle as proposed in this invention, a reasonable pressure drop through the lines and valves is of small consequence and connecting equipment may be smaller than in the case of a flue gas circulation. This, obviously, reduces investment cost.

In the accompanying drawings:

Fig. 2 is a schematic diagram of another form of equipment particularly adapted to use where the first-stage dehydrogenation catalyst is water-sensitive.

Fig. 3 shows another modification.

Figure 1:
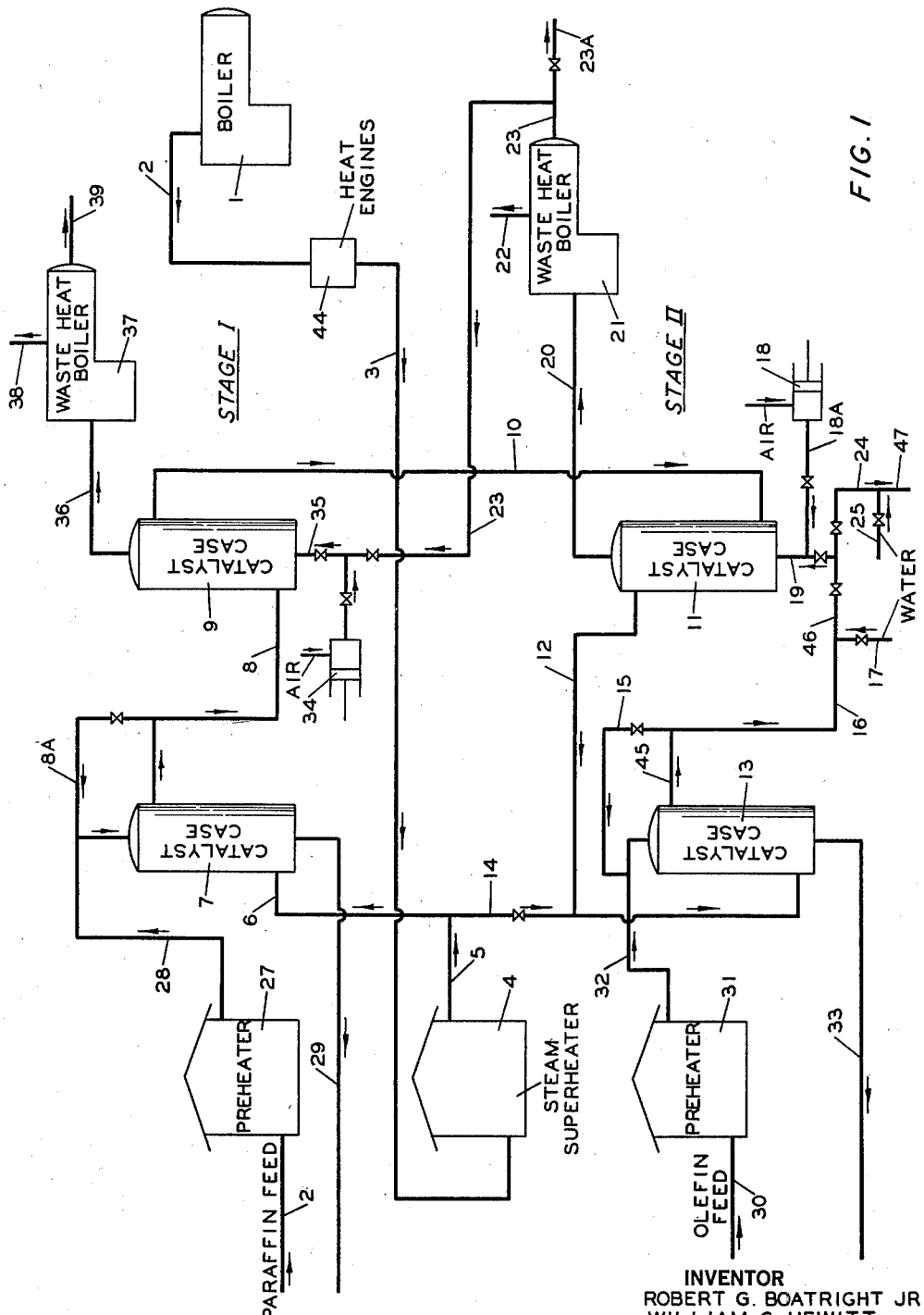
Fig. 1 is a schematic diagram of one form of equipment which may be used where the first-stage catalyst is water-insensitive.

It has heretofore been proposed to catalytically dehydrogenate butane to butadiene by a two-stage process. See Wiezevich et al., 2,209,215 and copending applications Serial Nos. 352,786, 352,787, 353,961, 353,962, and 355,710. It has also been proposed in this connection to use a water-sensitive catalyst and an anhydrous feed for the first stage and to use a water-insensitive catalyst and a feed embodying a substantial proportion of steam as a diluent for the second stage. See copending application of Schulze et al., Serial No. 412,636, filed September 27, 1941. The use of steam as a diluent offers marked advantage over the use of normally gaseous or non-condensible diluents such as carbon dioxide, nitrogen, methane, ethane, propane, oxygen-free flue gas, and the like since the generation of and handling of large amounts of steam under high pressure and at high temperature is much simpler from an engineering standpoint and much less expensive than for a non-condensible gaseous diluent which requires prohibitively expensive compressors, blowers, connecting lines and valves.

Accordingly in carrying out the present invention I use steam or equivalent material as the medium for diluting the hydrocarbons entering the second stage. I also use steam for heating one and preferably both endothermic reaction zones, for cooling one or both exothermic regeneration zones, and for the reactivating gas in at least the second reactivation zone where the catalyst contained therein is water-insensitive and in the first reactivation zone where the catalyt therein is water-insensitive. Frequently, however, the first-stage catalyst is water-sensitive so that it is not desirable to use steam in reactivating it.

In accordance with our invention the utilization of energy reaches the maximum theoretically possible for a process of this general type.

Our invention in a broader aspect may be briefly described as involving simultaneously carrying out an endothermic catalytic conversion, preferably dehydrogenation, in a catalytic conversion zone and an exothermic catalytic regeneration of a second bed of the same catalyst in a separate regeneration zone, and passing steam into heat exchange relationship with the conversion zone whereby heat is supplied thereto to maintain the reaction temperature at the desired level, and passing the effluent into indirect heat exchange relationship with the regeneration zone to remove heat therefrom and keep the temperature therein from exceeding a safe figure.

In a more specific aspect our invention involves the use of two catalyst zones, usually operating at different temperatures, in which the two endothermic stages of the dehydrogenation are carried out. Superheated steam at the necessary temperature to maintain the desired temperature is passed in indirect heat exchange relationship with one of the catalytic zones to supply heat thereto to maintain the conversion temperature therein at the proper level. The effluent is then passed successively in indirect heat exchange relationship with two regeneration zones corresponding to the catalyst zones to cool the same to the proper and safe regeneration temperature. The effluent is subsequently used as a regenerating gas medium, after admixture with an oxygen-containing gas to give the proper oxygen content, in one or both of the regeneration zones. Where the catalyst in the first stage is water-sensitive this effluent is used only in the second stage regeneration zone. Where the catalyst in both stages is water-insensitive, this effluent may be advantageously used in both, passing through them in series and, after going through one, having the necessary amount of heat abstracted, being admixed with more oxygen and then traversing the other.

A portion of the effluent steam from one of the conversion or regeneration zones may be passed into the hydrocarbon feed to the second catalytic converter to act as diluent therefor. If desired another portion may be similarly used as diluent for the first conversion stage, where the first stage catalyst is water-insensitive. The diluent for the second stage conversion is most advantageously withdrawn from the steam effluent leaving that conversion stage after supplying heat thereto.

Where the first-stage catalyst is water-sensitive, regeneration thereof may desirably be conducted in the conventional manner with a water-free gas such as for example a water-free blend of recycled flue gas and an oxygen-containing gas.

In one method of carrying out the present invention in accordance with the foregoing principles, superheated steam at the proper temperature is passed through the first conversion stage to heat it, then through the regeneration stages in series to cool them, then admixed if necessary, with sufficient superheated steam to maintain the second conversion stage at the proper temperature, and the mixture passed through the second conversion stage to supply heat thereto. The steam effluent is now divided, a portion passing into admixture with the hydrocarbon (olefin) feed to the second conversion stage to act as diluent therefor, and another portion being passed, after admixture with the proper amount of air or the like, through the second stage regeneration zone as regenerating gas therefor. The effluent may have heat abstracted therefrom as desired as by passing through a waste heat boiler and a portion thereof after admixture with air passed through the first stage regeneration zone to reactivate the catalyst therein, where said catalyst is water-insensitive. Where the first-stage catalyst is water-sensitive, the reactivation effluent from the second stage regeneration zone is not passed through the first stage regeneration zone in the manner just described. On the contrary, regeneration in the first stage is effected by any other means known to the art wherein a moisture-free regenerating gas is used.

The procedure just outlined is particularly advantageous where the first conversion stage is at one temperature and the second at a higher temperature, since the effluent from the cooler conversion stage is relatively cool and may be used to cool the successive regeneration stages in series, thereby being heated up to a temperature approaching or equalling that required for heating the hotter second conversion stage so that no or a minimum of superheated steam need be added thereto. Then the effluent from this second hotter conversion stage is at a sufficiently high temperature to enable it to be directly admixed with the feed thereto, and also sufficiently high to be used directly after adjustment to the proper free oxygen content and without supplying additional heat (but in fact removing heat as a general rule) as the regenerating gas for one or both (in series) of the regenerating zones. The effluent from the one regeneration zone is sufficiently hot that heat must be abstracted therefrom before it is used as regenerating gas for the other zone.

Thus our process as outlined above makes possible a more effective utilization of heat energy than any process heretofore proposed with which we are familiar.

While the order in which the steam is passed in cooling relation with the regenerating stages and the order in which the regenerating steam is passed through the regeneration stages may in some cases be reversed, we prefer to pass the steam in cooling relation with the first regeneration stage and then the second, and the regenerating steam through the second and then through the first regeneration stage.

The first stage regeneration may be conducted at substantially the same temperature as, or at a somewhat lower temperature than, the second stage regeneration. Where the two regeneration stages are conducted at substantially the same temperature, either the order in which they are cooled or the order in which they are regenerated, or both, may, if desired, be reversed from the preferred orders just set forth.

In a modification, the superheated steam is passed first in heating relationship with the second conversion stage, is then boosted by the necessary amount of superheated steam to maintain proper temperature in the first stage, passed through said first conversion stage in heating relationship therewith, then in cooling relationship with the two regeneration stages in series, the diluent for second stage conversion is now tapped off (though it may be less advantageously tapped off at any other point), and a portion of the balance passed through at least one of the regeneration stages to regenerate the same, as through the second when the first contains a water-sensitive catalyst, or through both stages in series when the first contains a water-insensitive catalyst.

The invention may be applied to the preparation of butadiene by the two-stage dehydrogenation of butane, the first stage being conducted over an alumina-chromium oxide catalyst (which is poisoned by water) at about 1100° F., and the second stage being conducted in the presence of steam and over a catalyst comprising alumina impregnated with barium hydroxide (which is water-insensitive) at about 1200° F., and the regeneration stages being carried out at between about 800° and about 1250° F.

Referring now to Fig. 1 of the accompanying drawings.

*Path of hydrocarbons*

A stream which may consist of any hydrocarbon or mixture of hydrocarbons whose composition is to be changed in stage I catalyst chamber 7, such as a paraffin hydrocarbon as, for example butane, is introduced to the system via line 26, passes through preheating furnace 27, thence via conduit 28 into stage I catalyst chamber 7 and thence leaves via conduit 29 for various separating processes or further processing.

Similarly, a stream which may consist of any hydrocarbon or mixture of hydrocarbons whose composition is to be changed in stage II catalyst case 13, such as an olefin hydrocarbon as for example butene or other desirable dehydrogenated components produced in stage I chamber 7, enters via line 30, passing through preheater 31, thence via line 32 to stage II catalyst case 13, and leaving via conduit 33 to various separation steps or further processing, such as separation of the butadiene.

*Path of steam*

Steam generated in boiler 1 passes via conduit 2 to various operating, non-condensing equipment 44 such as steam engines or turbines where all power available due to difference in pressure between conduits 2 and 3 is utilized. The steam then passes via conduit 3 to steam preheater 4 where heat of superheat is imparted and its temperature raised to the optimum operating temperature for the cycle. The superheated steam then passes via conduits 5 and 6 through the shell of tubular stage I catalyst case 7 which is on-stream. The reaction within the tubes of 7 is endothermic and therefore steam leaving 7 via conduit 8 is at a lower temperature than in conduit 6. If it is desired to admix a diluent with the hydrocarbons fed into 7, a portion of the steam may be passed into line 28 via line 8A. The steam then passes through the shell of the stage I catalyst case 9 which may be identical with catalyst case 7 but off-stream. The catalyst within the tubes of 9 is being regenerated by burning which is an exothermic reaction. Therefore the steam in the shell of 9 acts as a cooling medium and is heated to a certain degree so that the steam leaving via conduit 10 is at a higher temperature than in conduit 8.

The steam now passes through the shell of stage II catalyst case 11 which may be identical with stage II catalyst case 13 but off-stream. The catalyst within the tubes of 11 is being regenerated by burning. Therefore the steam acts as a cooling medium and absorbs heat to a certain degree. The steam in conduit 12 leaving the shell of 11 is therefore at a somewhat higher temperature than in conduit 10 and at a still higher temperature than in conduit 8.

The steam in conduit 12 now enters the shell of stage II catalyst case 13. If necessary, additional steam (superheated) may be added at this point from conduit 5 via conduit 14 for temperature control, as where the temperature of the steam leaving the shell of 11 is not sufficiently high. The reaction progressing within the tubes of stage II catalyst case 13 is endothermic and the necessary heat to maintain a constant temperature within these tubes is supplied by the steam in the shell. Accordingly the steam leaving via conduit 45 is at a lower temperature than in conduit 12.

At this point, the amount of steam required as a diluent enters conduit 32 via line 15. The entire quantity of steam diluent would have to be generated in the boiler house and superheated to the operation temperature of catalyst case 13, were it not previously used as the heating and cooling medium as described above. Its use, therefore, as the heating and cooling medium throughout all the previous equipment is of great advantage with regard to equipment installation costs and energy consumption.

The balance of the steam issuing via conduit 45, which is not required as a diluent, passes via conduit 16 toward catalyst case 11. As the temperature of this steam is too high for use as a regenerating agent, soft or distilled water is injected via conduit 17 in order to reduce the temperature in conduit 46 sufficiently for the initial entrance of the regenerating gas to the tubes of catalyst case 11. Any steam not required for regeneration of the catalyst in 11 is withdrawn via conduit 24. Soft or distilled water may be injected via conduit 25 so as to bring the temperature of steam leaving the system via conduit 47 to any desired level for use in other equipment.

Air supplied by compressor 18 is injected via line 18A in controlled amount into the steam in line 19. The temperature and oxygen content of the mixture of steam and air entering catalyst case 11 via line 19 are so controlled that the combustion of the carbon on the surface of the catalyst in the tubes of stage II catalyst case 11 proceeds smoothly.

The steam leaving stage II catalyst case 11 via line 20 is at a considerably higher temperature than the steam in conduit 19 and also contains a quantity of non-condensible gases. The steam in conduit 20 passes through waste heat boiler 21 into conduit 23. Live steam leaves waste heat boiler 21 via conduit 22, whence it may if desired be by-passed into line 3 by a suitable conduit (not shown). The steam leaving via conduit 23 is at a considerably lower temperature than in conduit 20. Excess steam may leave via conduit 23a.

An additional controlled quantity of air is likewise injected into the steam in conduit 23 by compressor 34. The resulting mixture of controlled temperature and oxygen content passes via conduit 35 as regenerating gas for the catalyst in the tubes of stage I catalyst case 9. This gas reactivates the catalyst in the tubes of 9 by burning and exits from the catalyst case via line 36 and thence to waste heat boiler 37. The steam leaving boiler 37 via line 39 may be used as a heating medium in various equipment throughout the plant. Live steam leaves waste heat boiler 37 via conduit 38.

As will be understood, suitable connections (not shown) are provided for interchanging converters 7 and 9 and converters 13 and 11 after regeneration is completed, thereby placing onstream the converters which have just been regenerated and connecting the formerly onstream converters to be regenerated. The time cycles for interchange of the stage I converters need not necessarily be the same as that for the stage II operation. In some cases more than two converters for each stage may be provided but the principles of operation will be the same.

In Fig. 2, the same general arrangement is shown except that the effluent regeneration gas leaving the second-stage converter 11 via line 20 is passed through waste heat boiler 21 and is then withdrawn via line 23 from the system instead of being subsequently used for regenerating in the first-stage converter 9. On the contrary, regeneration in converter 9 is effected by means of recycled regeneration effluent. At the start, Dutch oven 51, or equivalent device is used to supply oxygen-free flue gas which is drawn via line 52 through waste heat boiler 54 and thence via line 55 into blower 56 (which may conveniently be driven by one of the turbines 44 of Fig. 1) which compresses it and sends it in admixture with compressed air supplied by compressor 57 via line 58 into the tubes of converter 9 to effect reactivation of the catalyst therein. The effluent passes out via line 50 and may, after operation is established, be by-passed around furnace 51 via line 51A or passed through the furnace 51 for recycling. Excess gas built up may be bled off via line 59. Thus a closed system under pressure is established and regeneration accomplished without subjecting the first-stage catalyst to water in any substantial amount.

In Fig. 3 there is shown an arrangement generally similar to that of Fig. 1 but differing therefrom in that the path of the steam is as follows:

1. Through shell of stage II on-stream.
2. Then, after boosting with superheated steam, through shell of stage I on-stream.
3. Through shells of both regeneration stages in series.
4. Diluent for stage II on-stream tapped off.
5. Through tubes of both regeneration stages in series.

In Fig. 3 the showing is simplified for convenience. The steam passes via line 60 through the shell of converter 13, then via line 61, into which is injected via line 62 sufficient superheated steam to raise its temperature to say 1550° F., through the shell of converter 7, then via line 63 through the shell of converter 9, then via line 64 through the shell of converter 11, and then via lines 65 and 23 through the tubes of converters 11 and 9 in series. Diluent for converter 13 may be tapped off from line 65 via line 66 and admixed with the hydrocarbon feed to 13. While the arrangement of Fig. 3 gives rise to many of the advantages of the invention, it is less preferred than that of Figs. 1 and 2.

In Figs. 1 to 3, the order in which the steam goes through the shells of converters 9 and 11 on regeneration may be reversed, if desired. Likewise in Figs. 1 and 3 the order in which the steam as regenerating gas goes through the tubes of converters 9 and 11 on regeneration may be reversed if desired. In Figs. 1 to 3 the steam diluent for the second converter may, though less preferably be taken from the effluent from any other converter shell.

Example

Normal butane was dehydrogenated in a two-stage process to butadiene using the apparatus of Fig. 2. The butane was first dehydrogenated to butene in converter 7 over a bauxite-chromium oxide catalyst containing 10 weight per cent of chromium oxide at a temperature of 1100° F. and at a pressure of 33 pounds gauge. The effluent which was at 20# and 1100° F. was treated to recover the $C_4$ content thereof which contained about 30 mol per cent of butenes. This $C_4$ fraction was then heated and passed via line 32 in admixture with steam from line 15, the mixture containing 49 volume per cent of steam and being at 1200° F. and 5# pressure, into converter 13 operated at 1200° F. The catalyst in 13 was bauxite impregnated with 4.5 weight per cent of barium hydroxide. The effluent containing butadiene was withdrawn via line 33.

Steam at 250 lbs. per sq. in. generated in boiler 1, after passing through turbines 44 was at 155# and 367° F. It was superheated in 4 to 1550° F. and 54#. The major portion (83%) was then passed via line 6 through the shell of converter 7, leaving at 1150° F. and 48# via line 8, entering the shell of converter 9 and leaving via line 10 at 1190° F. and 42#. The steam then passes through the shell of converter 11 leaving via line 12 at 1234° F. and 36#. Since this is not at a desirably high temperature superheated steam from line 14 is injected to give steam at 1282° F. and about 36#. This passes through the shell of converter 13 and leaves via line 45 at 1202° F. and 30#. About 40% of the effluent passes via line 15 to act as diluent in the tubes of 13. The balance passes via line 16 into which water is injected via line 17. A portion of the resulting steam is admixed with compressed air supplied by 18 to give a regenerating gas mixture at 940° F. and 30# and containing 1.5–2.0% by weight of oxygen. The regeneration effluent at 1245° F. and 29# passes to boiler 21. Meanwhile, the catalyst in converter 9 is being regenerated by the mixture of recycled gas leaving blower 56 at 860° F. and of air at 260° F., the mixture being at 800° F. and at 120# and entering via line 59. The effluent at 1200° F. and 105# leaves via line 50 and after passing through boiler 54 is at 90# and 780° F. The desired portion then passes into blower 36 for having its pressure increased to about 120# and its temperature to 860° F.

Automatic means is provided for interchanging the converters which are on-stream and on regeneration at suitable intervals. The entire operation is thus continuous and automatic.

The pressures referred to herein are gage pressures.

Instead of steam, the common equivalents thereof may be used where suitable, such as mercury vapor, diphenyl vapor, etc., although these are much less preferred.

We claim:

1. A process of two-stage catalytic dehydrogenation of paraffin hydrocarbons to diolefin in which the first stage is carried out endothermically at one temperature and the second stage endothermically at a higher temperature, which comprises passing the hydrocarbons through the first catalytic zone, passing olefin content of the effluent of the first catalytic zone through the second catalytic zone, passing superheated steam in indirect heat supplying relationship with the first zone, passing the steam effluent of the first reaction zone in indirect heat abstracting relationship with an exothermic regeneration zone in which catalyst corresponding to that of said first zone is being exothermically regenerated, passing the steam effluent of said regeneration zone in indirect heat abstracting relationship with a second regeneration zone in which catalyst corresponding to that in the second zone is being exothermically regenerated and passing the steam effluent of the second regeneration zone in indirect heat supplying relationship with said second catalyst zone.

2. A process of two-stage catalytic dehydrogenation of butane to butadiene in which the first stage is carried out endothermically at about 1100° F. over an alumina-chromium oxide catalyst and the second stage endothermically at about 1200° F. over an alumina-barium hydroxide catalyst, which comprises passing the butane through the first catalyst zone, passing at least the butene content of the effluent through the second catalyst zone, passing superheated steam at a temperature sufficient to maintain the reaction temperature at about 1100° F. in indirect heat supplying relationship with the first catalyst zone, passing the steam effluent of the first catalyst zone in indirect heat abstracting relationship with a regeneration zone in which an alumina-chromium oxide catalyst is being exothermically regenerated, passing the steam effluent of the said regeneration zone in indirect heat abstracting relationship with a second regeneration zone in which an alumina-barium hydroxide catalyst is being exothermically regenerated, admixing superheated steam with the steam effluent of the second regeneration zone to raise its temperature sufficient to maintain the reaction temperature in said second catalyst zone at about 1200° F., passing the resulting steam in indirect heat supplying relationship with said second catalyst zone, passing a portion of the steam effluent of the second catalyst zone into admixture with the feed to said second zone as diluent therefor, and passing the balance in admixture with oxygen through said second regeneration zone to effect regeneration therein, and passing a substantially moisture-free gas containing from about 1.5 to about 2% by weight of oxygen through said first regeneration zone to effect regeneration therein.

3. A process of two-stage catalytic dehydrogenation of paraffin hydrocarbons to diolefins in which the first stage is carried out endothermically at one temperature and the second stage endothermically at a higher temperature, which comprises passing the hydrocarbons through the first catalytic zone, passing olefin content of the effluent of the first catalytic zone through the second catalytic zone, passing superheated steam in indirect heat supplying relationship with the first catalytic zone, passing the heat supplying steam effluent of the first catalytic zone in indirect heat abstracting relationship with a first regeneration zone in which catalyst corresponding to that in the first catalytic zone is being exothermically regenerated, passing the heat abstracting steam effluent of said first regeneration zone in indirect heat abstractive relationship with a second regeneration zone in which catalyst corresponding to that in the second catalytic zone is being exothermically regenerated, admixing the heat abstracting steam effluent of said second regeneration zone with superheated steam to raise its temperature substantially above the temperature of said second catalytic zone, passing the resulting steam in indirect heat supplying relationship with said second catalytic zone, passing a portion of the heat supplying steam effluent of said second catalytic zone into admixture with the hydrocarbon feed to said second catalytic zone as diluent therefor, and passing the balance in admixture with oxygen through said second regeneration zone to effect regeneration of catalyst therein, lowering the temperature of the regeneration steam effluent of the second regeneration zone, and passing the resulting regeneration steam in admixture with oxygen through said first regeneration zone to effect regeneration of catalyst therein.

ROBERT G. BOATRIGHT, Jr.
WILLIAM C. HEWITT.